US006229818B1

(12) United States Patent
Bell

(10) Patent No.: US 6,229,818 B1
(45) Date of Patent: May 8, 2001

(54) ACTIVE ISOLATION SYSTEM AND METHOD FOR ALLOWING LOCAL AND REMOTE DATA TRANSFERS ACROSS A COMMON DATA LINK

(75) Inventor: Russell W. Bell, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 08/888,651

(22) Filed: Jul. 7, 1997

(51) Int. Cl.$^7$ ........................................ H04J 3/16
(52) U.S. Cl. ............................ 370/466; 370/465
(58) Field of Search ..................... 370/465, 466, 370/467, 468, 449, 485, 486, 487; 375/354; 379/93

(56) References Cited

U.S. PATENT DOCUMENTS

| | | | |
|---|---|---|---|
| 5,479,447 | 12/1995 | Chow et al. | 375/260 |
| 5,557,612 | * 9/1996 | Bingham | 370/449 |
| 5,594,789 | * 1/1997 | Seazholtz | 379/207 |
| 5,625,651 | * 4/1997 | Cioffi | 370/506 |
| 5,668,857 | * 9/1997 | McHale | 379/93.07 |
| 5,756,280 | * 5/1998 | Soora | 455/4.2 |
| 5,764,750 | * 6/1998 | Chau | 370/467 |
| 5,828,666 | * 10/1998 | Focsaneanu | 370/389 |

FOREIGN PATENT DOCUMENTS 0 696 124 A2  2/1996  (EP) .
WO 96/29808   9/1996  (WO) .

OTHER PUBLICATIONS

SOHO Skyway, Author Unknown, Mar. 26, 1997, pp. 1–2 (Obtained from the Internet at http://www.sohoskyway.net/CustEq.html).
ADSL Forum: General Introduction to Copper Access Technologies, Author Unknown, May 13, 1997, pp. 1–6 (Obtained from the Internet at http://www.adsl.com/general_tutorial.html).
DI Networking Press Releases: DI Networking Offers Superfast Internet Access Solution, Issued by Bernard Binns, May 13, 1997, pp. 1–2 (Obtained from the Internet at http://206.48.77.57/press_11.html).
New DSL Technologies Enable High–Speed Delivery Across "Last Mile", Cisco Systems, Inc., Mar. 17, 1997, pp. 1–4 (Obtained from the Internet at http://www.–europe-.cisco.com/warp/public/797/3.html).
Alcatel 1000 ADSL Asymmetric Subscriber Line: Ready for the Superhighway?, Published by Alcatel, Undated, pp. 1–8.
Advanced Micro Devices Patent Application entitled: "Multipoint Access Protocol Utilizing A Point–To–Point Methodology", Date filed: Mar. 19, 1997, Ser. No.: 08/820,526.
Advanced Micro Devices Patent Application entitled: "Network Adapter Utilizing an Ethernet Protocol and Utilizing a Digital Subscriber Line Physical Layer Driver for Improved Performance", Inventor: Russell W. Bell, Date filed: Nov. 8, 1996, Ser. No.: 08/744,438.
Maxwell, K., "Asymmetric Digital Subscriber Line: Interim Technology for the Next Forty Years", *IEEE Communications Magazine*, 34(10):100–106 (Oct. 1, 1996).
Carbone, P., "Internet Thruway: A Profitable New Route for Data Traffic", *Telesis*, No. 102, 11 pages (Dec. 1996).

* cited by examiner

*Primary Examiner*—Douglas Olms
*Assistant Examiner*—Ricardo M. Pizarro
(74) *Attorney, Agent, or Firm*—Williams, Morgan & Amerson, P.C.

(57) ABSTRACT

A system and method for configuring a local network from particular nodes of a remote network is provided. A transmission medium forms a local network by connecting the nodes within the customer premise. The transmission medium also forms a remote network through a subscriber line which connects the customer premise to the remote service provider. The transmission medium is used for voice band communication between the customer premise and the remote service provider, for data band communication within the local network, and for data band communication between the local network and the remote service provider. A master node is coupled between the local network within the customer premise and the subscriber line to control data band communications between the local network and the remote service provider.

30 Claims, 5 Drawing Sheets

ACTIVE ISOLATION SYSTEM AND METHOD FOR ALLOWING LOCAL AND REMOTE DATA TRANSFERS ACROSS A COMMON DATA LINK

FIELD OF THE INVENTION

The present invention is directed generally to data communications, and more particularly to a system and method for isolating the local and remote sides of an active data termination point, to allow local and remote communications using a common data transfer technique across a common transmission medium.

BACKGROUND OF THE INVENTION

Computer networking involves the linking of computers, peripheral devices, and perhaps telephonic devices, into a consolidated data communications system. Technological networking advances are taking place at various networking levels, including multi-node network structures such as multipoint, star, ring, loop and mesh network topologies used in networks ranging from local area networks (LAN) to proliferative global area networks (GAN) such as the Internet. Of great consequence to the continued success of computer networking is the ability to efficiently and economically interconnect these various networks in local and remote configurations.

As networks continue to gain acceptance and favor, there is a continuing desire to transmit ever-increasing amounts of data across the transmission medium in a given amount of time. In other words, the increased demand for network solutions has propelled the need to maximize the data bandwidth. This need has led to many techniques and systems for increasing the data bandwidth, such as the use of T-carrier services (e.g., T1 and T3), and integrated services digital networks (ISDN).

Emerging applications for higher speed communications applications have driven the need for advanced technologies that leverage the installed base of communications platforms around the world. One such technology allows relatively high-speed data transmission over existing copper-based twisted-pair lines. This technology, referred to generally as digital subscriber line (DSL) technology, includes various species, including high-bit-rate DSL (HDSL), very high-bit-rate (VHDSL), and asymmetric DSL (ADSL). Each of these technologies allows digital information to be transferred from a service provider, via the existing copper telephone lines, at rates in the range of many megabits per second (Mbps). For example, an ADSL line can provide rates at 6 Mbps downstream from a service provider, and 384 Kbps upstream to the provider using the existing telephone line. As can be seen, these data rates far exceed many competing technologies (e.g., ISDN: 128 Kbps, T1: 1.544 Mbps, etc.). These higher digital connectivity data rates are being demanded by users for Internet access, telecommuting, video conferencing, and the like.

The significance of the use of the existing telephony copper base should not be underestimated. The undepreciated world-wide value of this asset has been estimated at over 600 billion dollars. There are approximately 700 million local loops around the world, and over 160 million of these are in the United States. It would therefore be desirable to utilize this pre-installed communications base, as physical connectivity costs would be greatly reduced.

Connections by individual computer users to networks such as the Internet has grown at astronomical rates. Moreover, surveys have indicated that many Internet subscribers have more than one computer at a local site, and it appears this trend will continue. Therefore, it is also becoming more common to connect small office/home office (SOHO) computers into a local network configuration within the SOHO environment.

The present invention provides a manner in which remote network technologies can be brought into the SOHO environment. It provides for a local area network that is independent of, yet compatible with, the remote network, without requiring additional cabling or hardware. The present invention, therefore, provides a solution to the aforementioned and other shortcomings.

SUMMARY OF THE INVENTION

Generally, the present invention relates to a system and method for isolating the local and remote sides of an active data termination point to allow local and remote communications using a common data transfer technique across a common transmission medium.

In accordance with one embodiment of the invention, a system for providing a local network at a customer premise and a remote network coupling the local network to a remote service provider is provided. The system includes a transmission medium forming a local network within the customer premise, and forming a remote network through a subscriber line connecting the customer premise to the remote service provider. The transmission medium is used for voice band communication between the customer premise and the remote service provider, for data band communication within the local network, and for data band communication between the local network and the remote service provider. A master node is coupled between the local network within the customer premise and the subscriber line. The master node controls data band communications between the local network and the remote service provider.

In accordance with another embodiment of the invention, the master node includes a digital subscriber line (xDSL) modem. The xDSL modem is configured to communicate with the remote service provider using an xDSL voice and data transmission scheme, and is further configured to communicate with customer premise equipment coupled to the local network using the xDSL voice and data transmission scheme.

In accordance with yet another embodiment of the invention, a method is provided for allowing remote voice signal and data signal transfers between a central office and one or more subscriber nodes via a transmission medium, while further allowing local data signal transfers among the subscriber nodes via the same transmission medium. A local portion of the transmission medium interconnecting the subscriber nodes is isolated from a remote portion of the transmission medium. Voice and data signals are distinguished from each other, and voice signals are provided to customer premises equipment connected to the local portion of the transmission medium. The local data signals on the local portion of the transmission medium, as well as the remote voice and data signals on the remote portion of the transmission medium, are transmitted via the common transmission medium using a transfer technology which is common to both the local and remote portions of the common transmission medium.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
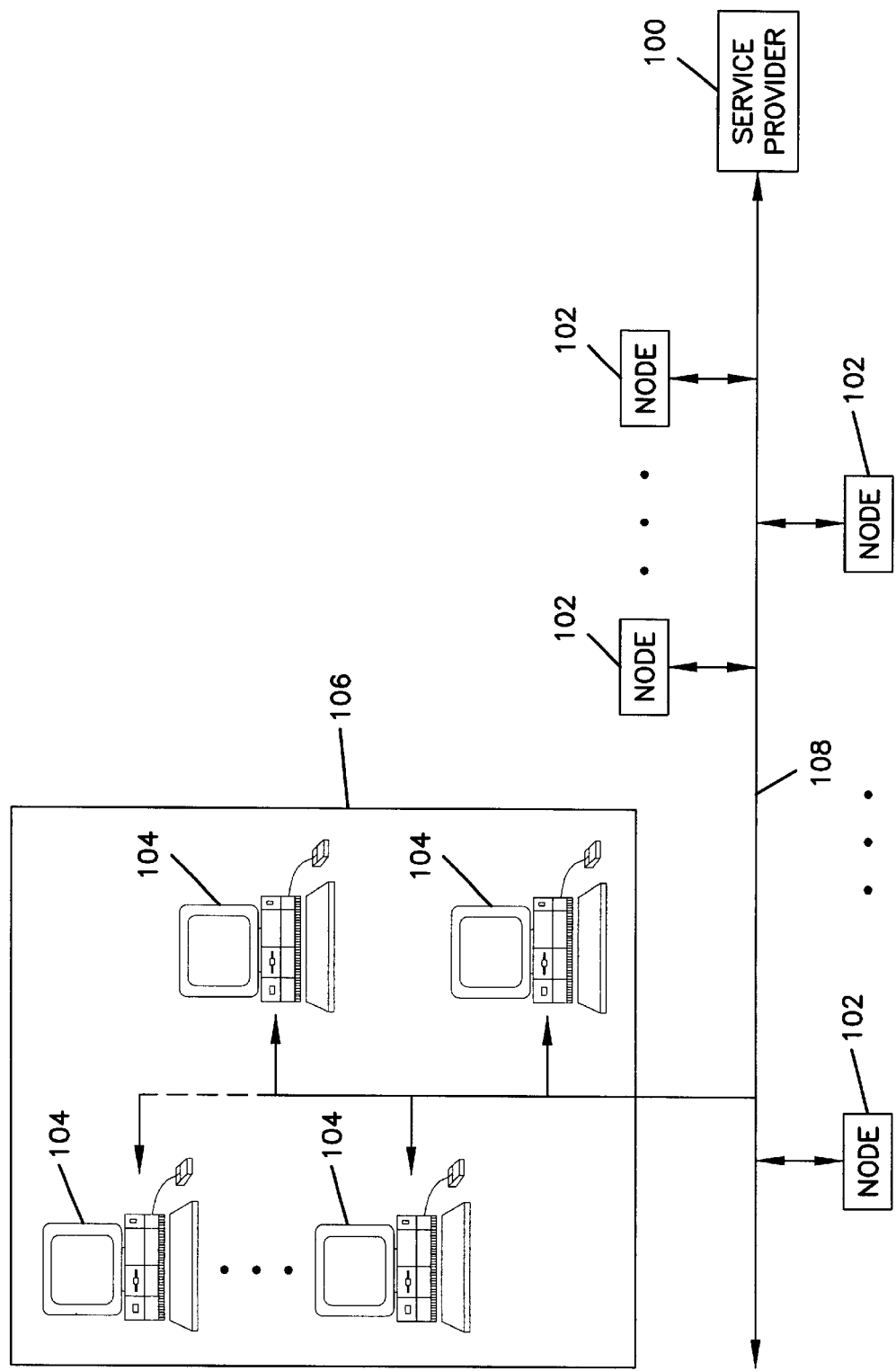
FIG. 1 is a block diagram of one embodiment of a connection of an internet service provider or remote node to a plurality of local nodes.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention generally provides a system and method for isolating the local and remote sides of an active data termination point, to allow local and remote communications using a common data transfer technique across a common transmission medium. In one embodiment, this is accomplished by providing an active master node within the local network which essentially provides a termination point within the remote network or wide area network (WAN). The addition of the active master node allows the existing remote network to be reconfigured such that an isolated local area network (LAN) is developed using a local group of the nodes in the remote network, while utilizing the same physical transmission medium and protocols as is used for remote data communication. Stated alternatively, the present invention allows a LAN or SOHO environment to be devised using a physical transmission medium and protocol which is common to the medium and protocol used for remote communications with the SOHO nodes. In one particularly beneficial embodiment of the invention, the existing twisted-pair telephone communications system is the transmission medium which is employed, wherein the active master node allows a local SOHO network to be configured from the same twisted-pair which provides remote communications to each of the nodes of the SOHO environment. Therefore, a local network may be created without the need for any additional cabling, or without the need for the implementation of a different protocol or modulation technique, while still allowing voice communications to take place over the twisted-pair telephone cabling.

The invention as described herein may be used in connection with many physical communications service links, such as various digital subscriber line (xDSL) technologies. "xDSL" represents various digital subscriber line transmission services including HDSL, ADSL, and VHDSL. While the present invention may be applicable to many various digital communication environments, an appreciation of various aspects of the invention will be gained through the following example diagrams and corresponding description, in which a twisted-pair communication medium using xDSL is described.

FIG. 1 is a block diagram of the connection of an internet service provider 100 or remote node to a plurality of local nodes. Each of the nodes 102, as well as nodes 104 within the local area 106, may exchange information with the service provider 100 via connection 108. The nodes 102 and 104 represent a variety of customer premises equipment (CPE), including workstations, client computers, personal computers, servers, printers, and other network-connected devices.

In order to network the nodes within the local area 106, most of the available interconnection technologies require the user to install additional cabling in order to connect their devices in a local network configuration. Other schemes have been proposed for interconnection capability based on power line carriers in which data is injected directly on the power cabling and removed at appropriate location inside a local network environment. However, the noise and security issues associated with power line carriers have reduced the effective data rates to tens of kilobits in most cases. Security is also an issue in power line carriers as transformers are often shared in a local network environment, and secondary leakage in the transformers may allow an adjacent building to intercept the traffic on such a local network.

Digital subscriber line techniques have traditionally been applied to connect remote information systems to subscriber nodes, requiring additional cabling in order to connect local computers into a local network. The present invention allows the nodes of a local area 106 to utilize the same transmission medium, such as interface 108, as is used for remote data transmissions. For example, in one embodiment of the invention, interface 108 includes a twisted-pair copper telephone line, which is used to communicate within the local network of area 106, and to communicate with the remote service provider 100. Furthermore, the present invention provides for local network communications which are isolated, and therefore rate independent, from remote communication transfers.

Figure 2:
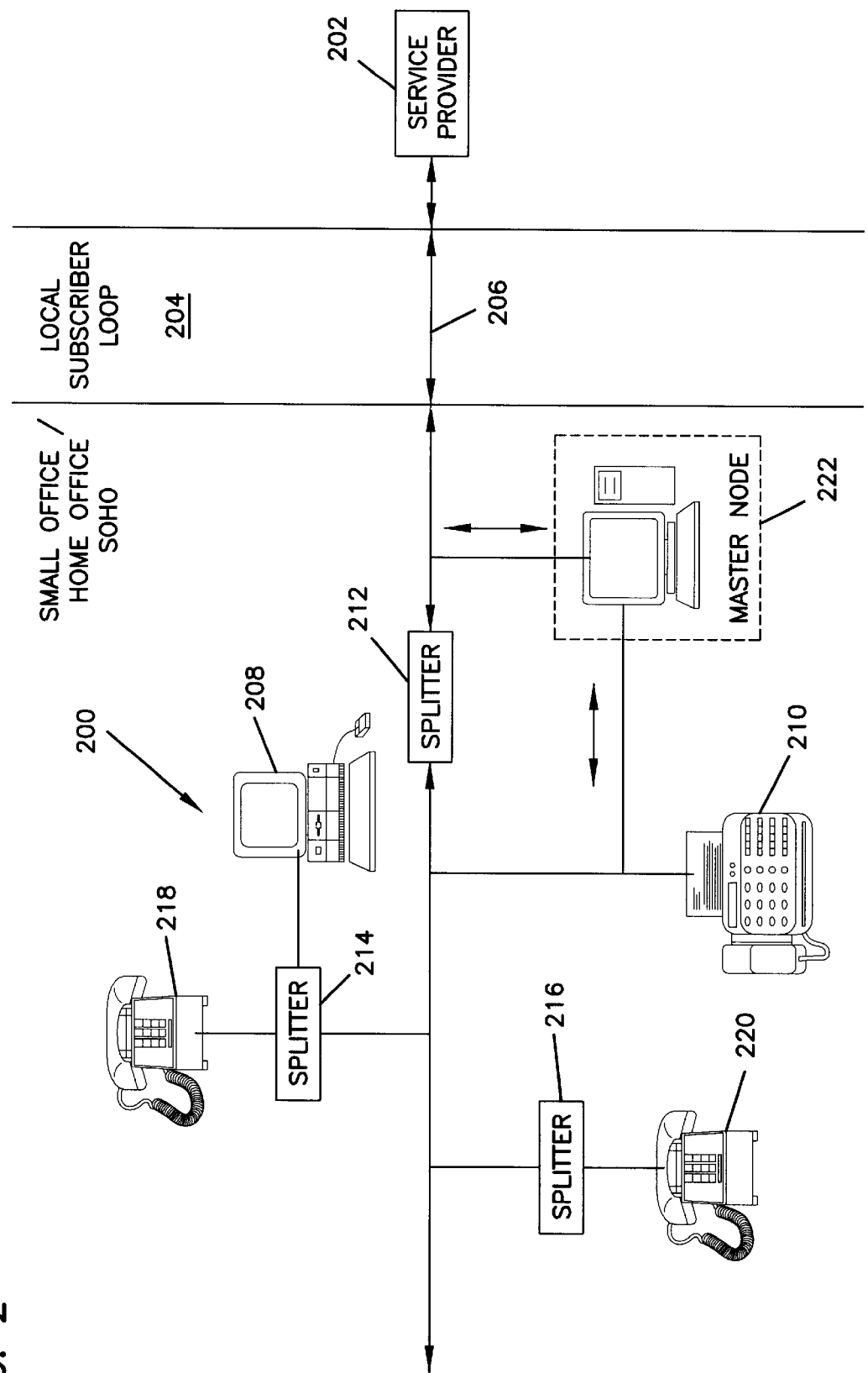
FIG. 2 illustrates a small office/home office (SOHO) environment in accordance with one embodiment of the present invention.

Referring now to FIG. 2, a small office/home office (SOHO) environment 200 in accordance with one embodiment of the present invention is illustrated. Each of the customer premises equipment (CPE) devices within the SOHO environment 200 is connected to the service provider 202 via the local subscriber loop 204. The subscriber loop 204 can represent any network connection configuration, but in a more particular sense refers to the copper telephone wire running between a customer's site and the local telephone company. In such a case, the service provider 202 is coupled to the SOHO 200 via the switching equipment at the central office (not shown) of the telephone company, where the physical medium comprising the local subscriber loop 204 is a standard twisted-pair cable 206 commonly used in local loop telephone connections. The central office may be equipped with modems to interface the service provider 202 to the SOHO 200, such as xDSL modems to allow service providers to provide xDSL data transfers over the telephone connections.

A variety of CPE devices may be part of the SOHO environment 200. For example, the devices comprising the SOHO environment illustrated in FIG. 2 include the computing unit 208 and the facsimile equipment 210. Both voice and data may be transmitted from the service provider 202 to the SOHO 200, where it is routed via the local twisted-pair line supplied by the local loop 204. The signal splitters 212, 214 and 216 are used to distinguish voice signals from data signals, and to route the appropriate voice and data signals to the appropriate device within the SOHO 200. For example, voice signals may be input to the splitter 214, which filters the voice signals from any information directed to the computer 208, while allowing the voice signals to be transmitted to the telephone equipment 218. Signal splitting may be determined in a manner described herein and in copending U.S. patent application, Ser. No. 08/888,870, entitled "Device and Method For Isolating Voice and Data Signals on a Common Carrier", which is assigned to the assignee of the instant application, the contents of which are incorporated herein by reference. It should be noted that the telephone equipment 218 and 220 is not limited to a telephone, but rather represents any telephonic equipment recognizing and/or allowing the transmission of signals in the voice frequency range.

While it is beneficial to allow data communications between the service provider 202 and the CPE devices within the SOHO environment 200, it may also be desirable to connect selected nodes of the remote network into a local network configuration. In other words, it may be desirable to arrange some of the CPE devices to form a local area network. Using a controlling function such as master node 222 within the SOHO environment 200, a local area network may be formed independent of the remote network yet utilizing the same physical medium. The present invention, utilizing a master node such as master node 222, therefore allows data to be transmitted within the local network over the same physical transmission medium as is used for remote data communications. The use of the master node 222 is described in greater detail below.

Figure 3:
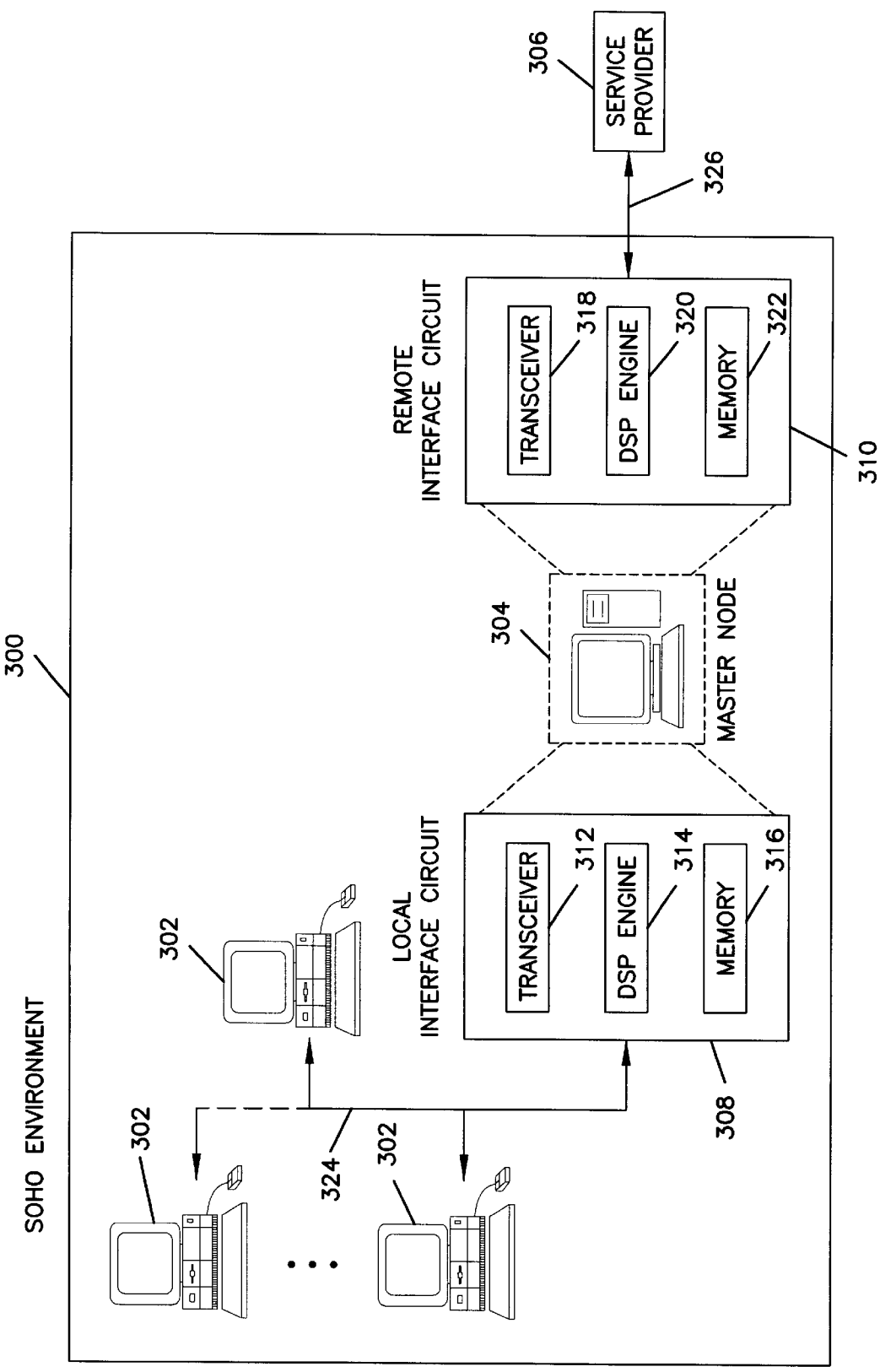
FIG. 3 is a block diagram illustrating the interface between the master node of the SOHO and the service provider in accordance with one embodiment of the invention.

FIG. 3 is a block diagram illustrating the interface between the master node of the SOHO and the service provider in accordance with one embodiment of the invention. The SOHO environment 300 illustrated includes a plurality of computing devices 302, or local nodes, and the master node 304. Other telephony devices and customer premises equipment not shown in FIG. 3 may be coupled within the SOHO environment 300, as was illustrated in connection with FIG. 2. Any of the computing devices 302 or other CPE devices may be designated as the master node. The master node 304 isolates local network data transfers within the SOHO 300 from the remote network data transfers between the service provider 306 and the nodes 302, 304.

The master node 304 includes interface circuitry which includes an xDSL modem that modulates and demodulates data between the SOHO environment 300 and a remote node such as the service provider 306. The embodiment illustrated in FIG. 3 includes a local interface circuit 308 and a remote interface circuit 310. The local interface circuit 308 includes a transceiver 312, a digital signal processing (DSP) unit 314, and a memory 316. The remote interface circuit 310 includes a transceiver 318, a DSP unit 320, and a memory 322.

The transceivers 312 and 318 represent a transmitter/receiver combination for transmitting outgoing data and receiving incoming data respectively. The transceivers 312 and 318 can accordingly be implemented using a transceiver device or any suitable transmitter/receiver combination. The transceiver 318 of the remote interface circuit 310 receives data sent from the service provider 306 or other remote node, where it is then processed by the DSP engine 320.

The DSP engine 320 performs digital signal processing for manipulating the transmitted data signals to facilitate data transmission. For example, in one embodiment of the invention, a discrete multi-tone (DMT) modulation scheme is used to transmit data along the twisted-pair transmission medium employing an ADSL link. DMT is a technology that dynamically adapts to changing noise environments, which theoretically means that the transmission reach can be improved by dynamically switching to frequencies with less interference. DMT introduces carrier tones on the line, and uses digital signal processing algorithms to measure what the signal-to-noise ratio (SNR) is for that tone. Depending on the SNR for that tone, a number of bits is assigned to be transmitted in that frequency bandwidth segment. The DSP 320 executes the digital signal processing required to measure such SNR values, and performs other signal processing tasks. The DSP 320 is also used in connection with other modulation schemes, such as carrierless amplitude-phase (CAP) modulation, and other modulation techniques known in the art.

The remote interface circuit 310 stores the data, which is conceptually illustrated by memory 322 in the remote interface circuit 310. The master node 304 includes a processing unit or other processing circuitry (not shown) which ascertains whether the data stored in the memory 322 is control information, routing information, or data destined for the master node 304 itself, or whether it is data destined for one or more of the nodes 302 within the local area network in the SOHO environment 300. If the master node 304 determines that the data is destined for one of the nodes 302, the master node 304 prepares to forward the information to the targeted node 302. During this buffering and analyzation interim at the remote interface circuit 310 and master node 304, local data transfers may be occurring on the local network. When the master node 304 is ready to forward the information to the proper node 302, the DSP engine 314 of the local interface circuit 308 can process the data stored in the memory 322 of the remote interface circuit 310, and transmit the information to the targeted node 302 by way of the transceiver 312. Where the local area network operates using a different data transfer protocol than the remote network, the master node 304 can first convert the information to use the proper local data transfer protocol. However, the same physical transmission medium, which is twisted-pair telephone cabling in one embodiment of the invention, is used on each side of the master node 304.

Transfers from a local node 302 directed to the service provider 306 are accomplished in an analogous fashion. Information from the local node is received at the transceiver 312 and stored in the memory 316. The master node 304 determines where the information is directed, and triggers the DSP engine 320 to process the data prior to sending to the remote node via the transceiver 318.

Transfers between nodes 302 within the local network 300 are also managed by the master node 304. In order for the master node 304 to manage the local network data transfers, as well as route information to the proper node 302 upon the receipt of data from a remote node, the local network of the SOHO environment 300 is arranged on a point-to-point basis, or logically converted from a multi-point network configuration to a point-to-point network configuration. Conversion from a multi-point network configuration to a point-to-point network configuration is described in more detail in connection with FIG. 5.

FIG. 3 has been illustrated and described conceptually with two interface circuits, but as will be appreciated by those skilled in the art, the interface circuits 308 and 310 can be integrated to reduce the circuitry required. For example, a single DSP engine can be shared. Furthermore, a single partitioned memory can be shared to store data packets corresponding to the local and remote networks in separate memory partitions. In one embodiment, the memory of the master node 304 computing unit is used to buffer the data packets. Furthermore, the functions of the local and remote interface circuits 308 and 310 can be incorporated generally into an xDSL modem. Therefore, FIG. 3 represents one conceptual embodiment of the invention which is capable of modification, which can be appreciated by those skilled in the art from the foregoing description without departing from the scope and spirit of the invention.

The use of the interfacing circuitry associated with the master node 304 therefore bridges the SOHO environment 300 and remote data nodes. It allows information to be transferred locally between local network nodes 302 via the transmission medium 324, while allowing other information to be transferred remotely between a remote node and the local network nodes 302. Local data transfers utilize transmission medium 324, while remote data and voice transfers use both transmission medium 324 and transmission medium 326.

Figure 4:
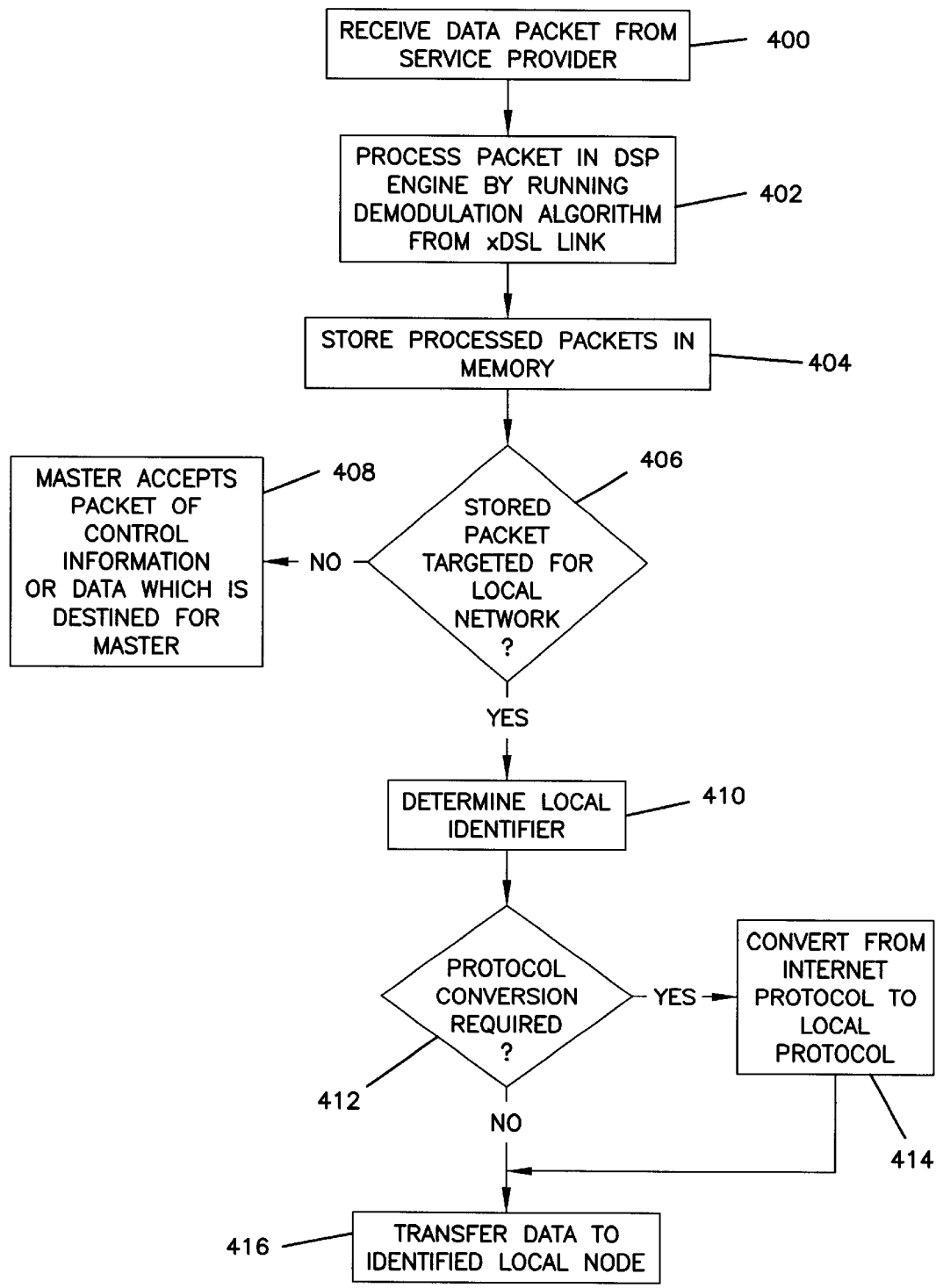
FIG. 4 is a flow diagram illustrating one embodiment of the isolation responsibilities of the master node when receiving data remotely.

FIG. 4 is a flow diagram illustrating the isolation responsibilities of the master node when receiving data remotely, in accordance with one embodiment of the invention. One or more data packets are received 400 from the internet service provider, or central office (CO). The one or more data packets are processed 402 by the digital signal processing (DSP) by running a demodulation algorithm for the xDSL load. These processed data packets are stored 404 in a memory of the master node.

The master node determines 406 whether the stored packet includes data targeted for one or more of the nodes within the local network. If not, the packet likely contains control information or other information for use by the master node, which the master node then accepts 408. Where the master node determines 406 that a stored packet is targeted for the local network, the master node determines 410 what the local identifier is in order to assist the master node in properly routing the data within the local network. In some situations, the internet data transfer protocol may be different from the data transfer protocol used by the local network. This is possible due to the isolation of the local network and the internet connections provided by the master node. The master node determines 412 whether a protocol conversion is required, and if so, converts 414 from the internet protocol to the local protocol. When no protocol conversion is required, or subsequent to a protocol conversion, the data is transferred 416 to the local node which has been identified by the master node. In this manner, the master node isolates the local from the remote data transfers.

Figure 5:
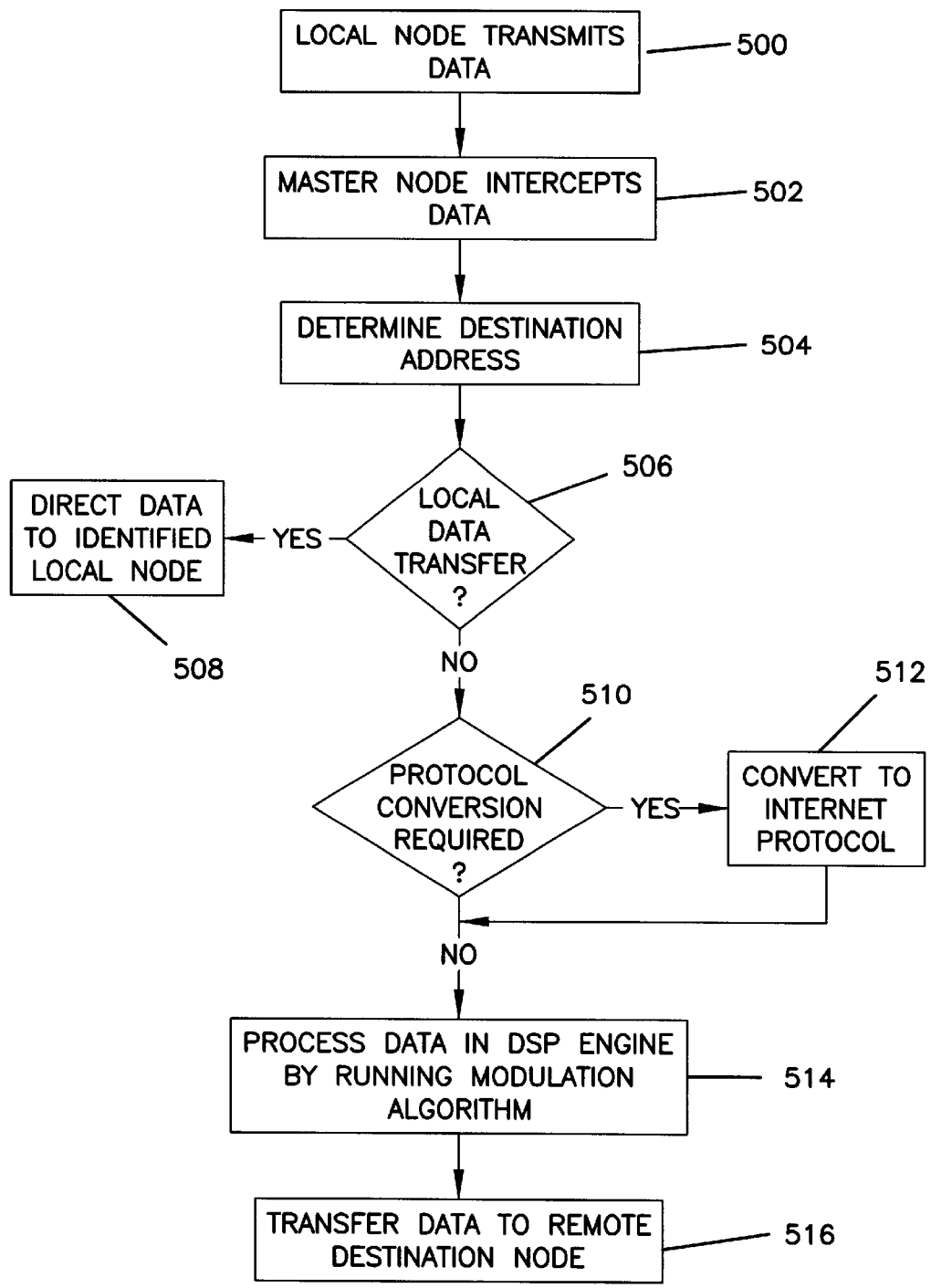
FIG. 5 is a flow diagram illustrating one embodiment of the responsibility of the master node in directing data traffic from the local network to a remote node.

FIG. 5 is a flow diagram illustrating one embodiment of the responsibility of the master node in directing data traffic from the local network to a remote node. One or more of the local nodes in the local network transmits 500 data which is destined for the remote node. The master node intercepts 502 this data, which provides the isolation between the local network and the remote network. The master node determines 504 the destination address corresponding to the data being sent.

The master node determines 506 from the destination address whether the data transfer is targeted for a node within the local network. If the data transfer is a local transfer, the data is directed 508 to the local node identified by the destination address within the local network. Alternatively, local data traffic may be transferred directly to a local node, thereby bypassing the master node. This can be accomplished by using a form of local node identification, such as an address or using dedicated frequencies for transmission between local nodes.

If the data transfer is targeted for a remote node (e.g., a node outside of the local network), the master node prepares to forward the data to the remote node. If it is determined 510 that the remote data transfer protocol differs from the local data transfer protocol, the master node converts 512 to the internet protocol. When no protocol conversion is required, or subsequent to a conversion to the internet protocol, the data is processed 514 in the DSP engine by running a modulation algorithm. The data is then transferred 516 to the remote destination node using the modulation technique determined by the DSP engine.

The master node isolates local network communications from remote network communications in the manner described above. The local network may take on various network topologies, including multi-point network configurations and point-to-point network configurations. A point-to-point configuration refers to a network configuration wherein each of the nodes are connected to each other on a point-by-point basis. In other words, each of the nodes is connected to each other on a physical (hardware) level by way of dedicated physical connections. A multi-point configuration refers to a network where the nodes are connected to each other over a shared communication medium, such as a bus or ring network topology. For multi-point configurations, a multi-point protocol is generally required in order to avoid conflicts in allocation of the shared communication medium.

In one embodiment of the invention, multi-point network configurations are logically converted to a collection of point-to-point network connections. In such a case, where the local network is a multi-point network, the multi-point network is logically (as opposed to "physically") converted, or equalized, to a series of point-to-point connection configurations. Recognition of multipoint network configurations as a collection of point-to-point network configurations may be determined in a manner described herein and in copending U.S. patent application, Ser. No. 08/820,526, filed on Mar. 19, 1997, entitled "Multipoint Access Protocol Utilizing a Point-to-Point Methodology", which is assigned to the assignee of the instant application, the contents of which are incorporated herein by reference.

As noted above, the present invention provides a system and method for isolating the local and remote sides of an active data termination point, to allow local and remote communications using a common data transfer technique across a common transmission medium. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A system for providing a local network at a customer premise and a remote network coupling the local network to a remote service provider, the system comprising:

a transmission medium including a local network within the customer premise and a subscriber line connecting the customer premise to the remote service provider, the transmission medium being used for voice band communication between the customer premise and the remote service provider, for data band communication within the local network and, for data band communication between the local network and the remote service provider; and a master node coupled between the local network within the customer premise and the subscriber line, the master node controlling data band communications between the local network and the remote service provider, and controlling the data band communication within the local network.

2. A system as recited in claim 1, wherein the master node comprises a digital subscriber line (xDSL) modem, the xDSL modem being configured to communicate with the remote service provider using an xDSL voice and data transmission scheme and to communicate with customer premise equipment coupled to the local network using the xDSL voice and data transmission scheme.

3. A system as recited in claim 2, wherein the master node further comprises memory to buffer data band communications between the local network and the remote service provider during data band communication within the local network.

4. A system as recited in claim 2, wherein the master node further comprises a digital signal processing (DSP) engine to modulate the data band communications between the local network and the remote service provider to facilitate data transmission.

5. A system as recited in claim 4, wherein the DSP engine modulates the data band communications using a discrete multi-tone (DMT) modulation scheme.

6. A system as recited in claim 4, wherein the DSP engine modulates the data band communications using a carrierless amplitude-phase (CAP) modulation scheme.

7. A system as recited in claim 1, wherein the master node comprises a local interface circuit and a remote interface circuit configured to interface to the local and remote networks respectively, the local and remote interface circuits comprising:

a transceiver coupled to transmit and receive data between the local and remote networks;

a digital signal processor (DSP) coupled to the transceiver to modulate the data band communications between the local network and the remote service provider in accordance with a predetermined modulation scheme; and a memory to buffer data band communications between the local and remote networks during data band communication within the local network.

8. A system as recited in claim 1, wherein the master node comprises a processing unit configured to identify and direct the data band communications to targeted nodes of the local network and the remote service provider.

9. A system as recited in claim 8, wherein the processing unit is further configured to distinguish voice band communications from data band communications, and to disregard the voice band communications.

10. A system as recited in claim 1, further comprising signal splitters coupled to each node of the local network to distinguish voice band communications from data band communications, and to direct the voice band communications to nodes configured for operation in the voice band and the data band communications to nodes configured for operation in the data band.

11. A system as recited in claim 1, wherein the transmission medium comprises a copper, twisted-pair telephone line.

12. A system as recited in claim 1, wherein the transmission medium comprises existing plain old telephone system (POTS) cabling traditionally used for the voice band communications.

13. A method for allowing remote voice signal and data signal transfers between a central office and one or more subscriber nodes via a transmission medium, and for allowing local data signal transfers among the subscriber nodes via the transmission medium, comprising:

isolating a local portion of the transmission medium interconnecting the subscriber nodes from a remote portion of the transmission medium;

controlling both the local data signal transfers on the local portion of the transmission medium and the remote voice and data signal transfers between the local and remote portions of the transmission medium with an interface module coupled between the local and remote portions of the transmission medium;

distinguishing the voice signals from the data signals; and transmitting the local data signals and the remote voice and data signals on the local and remote portions of the transmission medium respectively, using a transfer technology common to both the local and remote portions of the transmission medium.

14. The method of claim 13, further comprising buffering the remote data signals during the local data signal transfers occurring at the local portion of the transmission medium, and buffering local data during the remote data transfers via the remote portion of the transmission medium.

15. The method of claim 13, wherein isolating the local portion of the transmission medium comprises intervening between the local portion and the remote portion of the transmission medium with the interface module.

16. The method of claim 13, wherein controlling the remote data signal transfers comprises directing data to a targeted one of the subscriber nodes identified by the remote data signal.

17. The method of claim 13, wherein controlling the remote data signal transfers comprises directing data from particular ones of the subscriber nodes to the central office.

18. The method of claim 13, wherein controlling the local data signal transfers comprises routing data on the local portion of the transmission medium to a targeted one of the subscriber nodes identified by the local data signal.

19. The method of claim 15, further comprising transmitting the remote data signals between a remote service provider and the central office, wherein the central office includes first xDSL modems to convert data transmitted in a voice frequency band to data transmitted in a data frequency band recognizable by second xDSL modems at the active device.

20. The method of claim 13, wherein the remote voice signal and data signals are transmitted in predetermined voice and data frequency bands respectively.

21. The method of claim 13, wherein transmitting using the transfer technology common to both the local and remote portions of the transmission medium comprises configuring plain old telephone system (POTS) twisted-pair cabling to allow both voice and data transmission at both the local and remote portions of the transmission medium.

22. The method of claim 13, wherein transmitting using the transfer technology common to both the local and remote portions of the transmission medium comprises configuring the transmission medium for digital subscriber line (xDSL) voice and data transmission at both the local and remote portions of the transmission medium.

23. The method of claim 13, further comprising modulating the remote data for transmission between the local and remote portions of the transmission medium.

24. A method for fashioning a local network from preselected local nodes of an existing remote network, wherein the remote network includes at least one remote service provider coupled to the local nodes through twisted-pair telephone cabling via a central office, comprising:

allowing concurrent voice and data signals across the twisted-pair telephone cabling;

separating voice band communications from data band communications;

regulating the data band communications to provide for remote data transfers between the local nodes and the central office, and for local data transfers amongst the local nodes, across the twisted-pair telephone cabling.

25. The method of claim 24, wherein regulating the data band communications comprises suspending remote data transfers during local data transfers, and suspending local data transfers during remote data transfers.

26. The method of claim 24, wherein the local data transfers are accomplished via dedicated frequency bandwidth segments on the twisted-pair telephone cabling in a discrete multi-tone (DMT) modulation scheme, and wherein the local data is transferred on the dedicated frequency bandwidth segments concurrently with the transfer of the remote data between the central office and the local nodes which are not involved in the local data transfer.

27. The method of claim 24, further comprising effecting both the local and remote data transfers by implementing an xDSL transfer link between the local nodes of the local network, and between the central office and the local network.

28. A system for creating a local network within a remote network, comprising:

a group of data communication devices coupled by way of standard telephone cabling to form the remote network;

a shared control module interposed along the standard telephone cabling to form the local network by isolating a first plurality of the data communication devices from a second plurality of the data communication devices, the shared control module comprising an interface circuit to intercept and control remote data transmissions between particular ones of the first plurality and second plurality of the data communication devices, and to intercept and control local data transmissions between particular ones of the first plurality of the data communications devices; and whereby the shared control module provides a common interface between each of the data communication devices of the local network and the second plurality of communication devices, and among each of the data communication devices of the local network.

29. The system as in claim 28, wherein the shared control module further comprises a buffer to allow local network communication rates to be independent of remote network communication rates.

30. The system as in claim 28, wherein the shared control module further comprises a protocol converter to convert between a first transmission protocol used by the remote network and a second transmission protocol used by the local network.

* * * * *